May 14, 1968 — W. E. HOWALD — 3,383,093
HOLLOW TURBOMACHINERY BLADES
Filed June 23, 1966 — 2 Sheets-Sheet 1
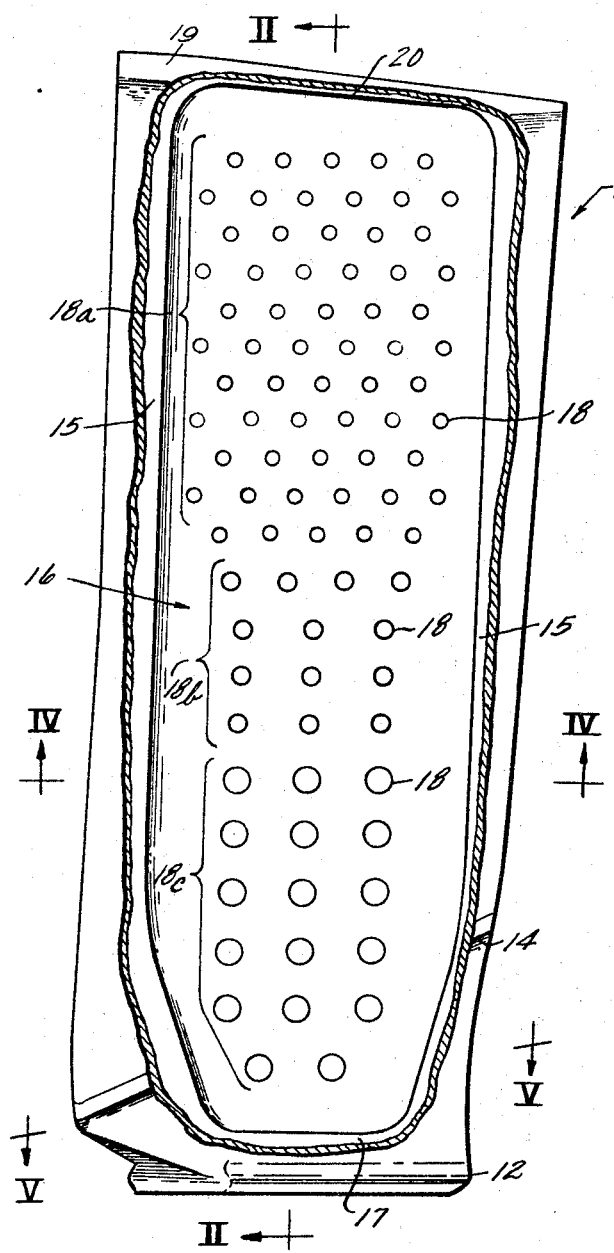
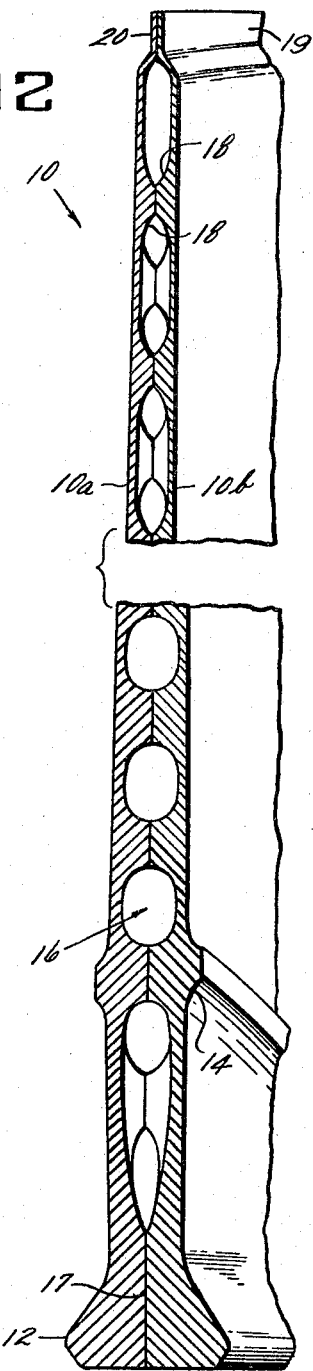
INVENTOR.
WERNER E. HOWALD
BY
ATTORNEY May 14, 1968     W. E. HOWALD     3,383,093
HOLLOW TURBOMACHINERY BLADES
Filed June 23, 1966     2 Sheets-Sheet 2
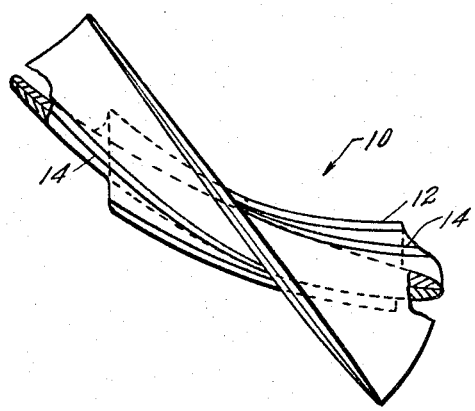
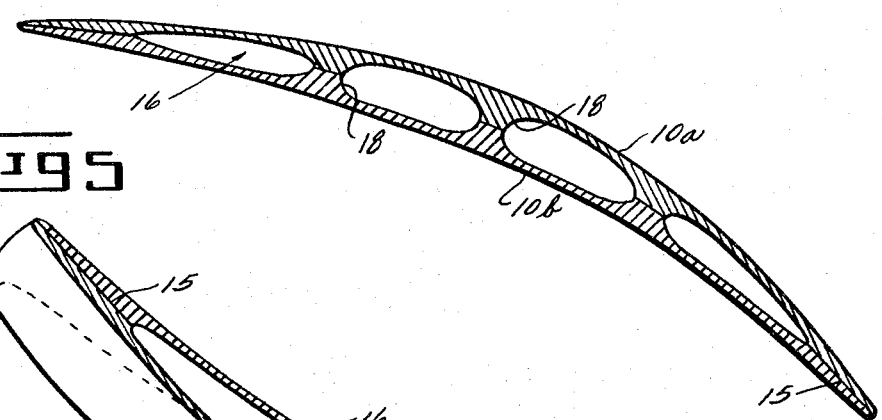
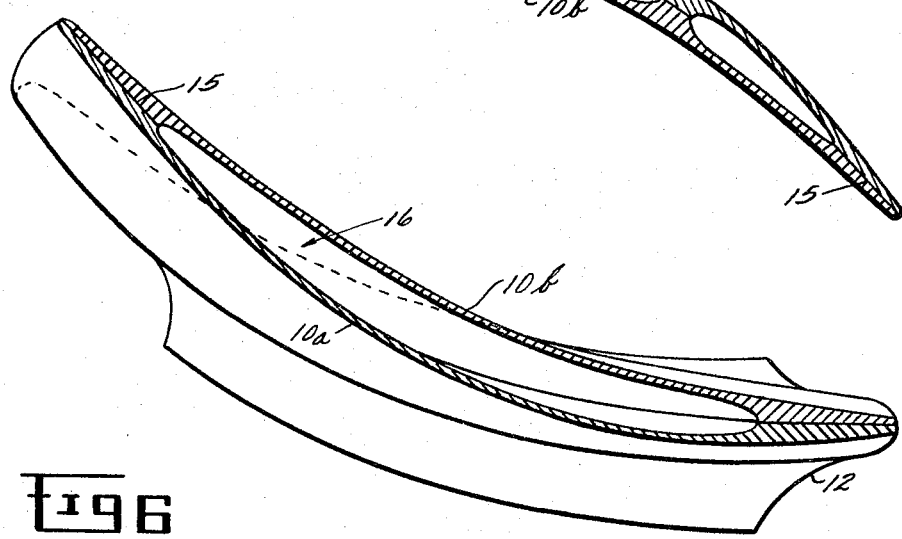
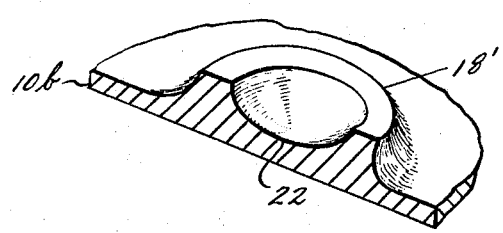
INVENTOR.
WERNER E. HOWALD
BY
ATTORNEY United States Patent Office 3,383,093
Patented May 14, 1968

3,383,093
HOLLOW TURBOMACHINERY BLADES
Werner E. Howald, Cincinnati, Ohio, assignor to General Electric Company, a corporation of New York
Filed June 23, 1966, Ser. No. 559,968
5 Claims. (Cl. 253—77)

ABSTRACT OF THE DISCLOSURE

The disclosure shows a lightweight hollow blade, formed by two hollow shells defining a cavity with button-like projections joined within the cavity to provide rigidity.

---

The present invention relates to improvements in blades employed in axial flow compressors and turbines which are referred to as turbomachinery.

The need and desirability for gas turbine engines of lightweight construction for the propulsion of aircraft have long been recognized and motivated, among other innovations, many proposals to employ hollow blades in the compressors and turbines of such engines. Hollow blades not only reduce weight but can also provide passageways for the introduction of cooling air into the blades themselves where the gas stream acting upon the blades is at an elevated temperature. U.S. Patent No. 3,017,159 is illustrative of prior hollow blade constructions.

However, performance characteristics now desired of such engines have found known hollow blade constructions deficient in minimizing weight, while providing adequate strength as well as rigidity to minimize vibration. To illustrate this point, present turbofan engines have a fan or low pressure compressor. The bladed fan rotor has a tip diameter of as much as eight feet and a tip speed in excess of the speed of sound. It will be evident that blade weight becomes an important factor not only in overall engine weight, but also in relation to the radial forces which are generated by centripetal acceleration.

Accordingly, the object of the present invention is to provide an improved hollow blade construction for turbomachinery and, more particularly, to provide a hollow blade which gives maximum strength and rigidity while minimizing weight.

These ends are attained by a blade having a base portion for attachment to a turbomachinery rotor and an outer portion extending therefrom which is a project into a gas stream. The outer portion of the blade has an airfoil cross section with the curved airfoil surfaces of the blade extending from the leading and trailing edges of the blade. The blade is preferably formed by two halves disposed on opposite sides of the median camber line of the airfoil cross section throughout the radial length of the blade. The halves are joined along surfaces extending a substantial distance inwardly and marginally of the leading and trailing edges. These halves are relieved from the joined surfaces to form thin side walls, defining a hollow cavity within the blade. The blade halves have opposed projections extending from the side walls to the median camber line within the cavity and the halves are also joined at matching surfaces of the opposed projections. The blade is further characterized in that the projections are spaced apart throughout the width and length of the cavity, and the projections are of smoothly curved, preferably circular, cross section and blend from their outer ends to the inner cavity surfaces on smoothly curved surfaces.

Particularly in the fabrication of large blades, it is preferable that the end surfaces of these projections be recessed by smoothly blended surfaces to further reduce weight.

The above and other related objects and features of the invention will be apparent from a reading of the following description of the disclosure found in the accompanying drawings and the novelty thereof pointed out in the appended claims.

In the drawings:
FIGURE 1 is an elevation, with portions broken away, of a hollow blade embodying the present invention;
FIGURE 2 is a section, on an enlarged scale, taken on line II—II in FIGURE 1;
FIGURE 3 is a plan view of the blade seen in FIGURE 1;
FIGURE 4 is a section, on an enlarged scale, taken on line IV—IV in FIGURE 1;
FIGURE 5 is a section, on an enlarged scale, taken on line V—V in FIGURE 1; and
FIGURE 6 is a fragmentary perspective view of a blade embodying a modified embodiment of the invention.

The drawings illustrate a rotor blade 10 which is specifically intended for use in a so-called "fan" or low pressure compressor of a gas turbine engine of the type wherein a "core engine" generates a hot gas stream that is, in turn, employed to drive the fan as well as to provide a propulsive force. The fan discharges a large volume air stream through a nozzle to provide a further propulsive force. One characteristic of such fans is that they incorporate rotors having relatively long blades and a large tip diameter, for example, as great as eight feet. Blade strength and blade weight, among other parameters, become extremely important where the tip speeds actually exceed the speed of sound.

The blade 10 is formed with a tang 12 at its base. The tang 12 is preferably arcuately shaped for reception in a correspondingly curved groove in the periphery of a rotor hub (not shown), whereby stresses induced in the blade during operation may be most effectively transmitted to the rotor hub.

A platform 14 projects from each side of the blade at the base of the airfoil portion thereof so that platforms of adjacent blades on a rotor may define the inner bounds of the gas flow path into which the blade projects. The blade 10 is preferably formed of two halves 10a and 10b disposed on opposite sides of the median camber line of the airfoil cross section of the blade throughout the radial extent thereof. Each half also continues to the lower end of the blade at the bottom of the tang 12 on opposite sides of what would be an extension of the median camber line of the airfoil cross section. Each half 10a and 10b extends from the leading to the trailing edge of the compositely formed blade, one half defining the pressure side thereof and the other defining the suction side. The halves are joined together at surfaces 15 extending marginally inwardly from the leading and trailing edges and are also joined together at surfaces 17 extending marginally from the bottom of the tang. Further, at the outer or tip end of the blade the thickness of the two halves is substantially reduced to form a squealer 19 with the reduced thickness portions thereof likewise being joined together along surfaces 20 marginally of the tip end.

The interior surfaces of the halves 10a and 10b are relieved in a gradually curved fashion to provide relatively thin side walls for the blade and thus define a hollow cavity 16 within the blade. It will be noted from FIGURE 2 that the thickness of the blade side walls progressively increases from the tip end to the base thereof. Within the blade cavity are provided a plurality of projections 18 which extend from opposite side walls of the blade halves, in matching relation, to the median camber line of the airfoil cross section. These projections are circular in cross section and have a smoothly curved, longitudinal profile blending from the outer button-like surfaces thereof to the inner wall of the cavity. These projections are likewise joined together. The joined surfaces of the button, as well as the joined surfaces marginally of the hollow cavity 16, may be joined by diffusion bonding or by other appropriate processes or methods which give sufficient strength for the two halves to function as an integral unit.

The arrangement of the projections 18 is of particular significance in attaining the overall objects of the invention. The described configuration of these projections causes any stress loading thereon to be distributed to the thin-walled portions of the blade with a minimum of stress concentration, thereby increasing, not only their initial strength, but also increasing as well, their working life which is extended by the elimination or substantial diminution of such stress concentrations.

Also of significance is the side and distribution of the projections 18. As was mentioned above, the side wall thickness of the blade progressively increases (FIGURE 2) from the tip end to the base thereof. This configuration minimizes the overall mass of the blade and particularly minimizes the mass of the blade at the tip end thereof. Further, it provides a maximum stiffness for the blade for a given weight. Minimizing mass weight at the tip portion to blade stiffness provides a blade which has a very high natural frequency so that in operation the blade will not have induced therein self-destructive vibration.

At the outer end of the blade the projections are arranged in a group 18a. In this group the projections have a relatively small circular cross section and are relatively closely spaced together in alternately staggered, radial rows. This arrangement provides a minimum of weight, while at the same time enabling the thin, wall sections to be adequately supported to prevent local skin panel vibration between adjacent projections. The projections of an intermediate group 18b have a greater circular cross section and are spaced further apart. The buttons 18b again provide an optimum weight condition, while preventing local panel vibration between adjacent buttons. A third group of buttons 18c is provided at the base. These buttons are characterized by an increase in diameter.

The increased diameters of the buttons in groups 18b and 18c provide adequate areas of the joined surfaces of the two halves, 10a and 10b to carry the shear loadings induced therebetween, which are greatest at the base or adjacent the base of the blade.

The described projections 18 and their spacing within the blade cavity 16 have been found highly effective in providing lightweight blades which have sufficient strength for operation at extreme speeds and further have the desirable characteristic of a high natural frequency.

FIGURE 6 illustrates a modified form of projection 18' which is employed particularly in the fabrication of extremely large blades. The projection 18' has a smoothly curved recess 22 in its end face which is substantially concentric with its longitudinal axis. The opposed projection from the other blade half (not shown) would be correspondingly formed so that these projections can likewise be joined together substantially on the median camber line of the blade. This arrangement further minimizes weight while providing the desired strength and rigidity.

While the interconnecting projections described herein have a circular cross section, it will be appreciated that elliptical, oval, and similar cross sections which are smoothly curved and have a relatively small length to width ratio could also be used. It is therefore to be understood that the described and preferred embodiment is not necessarily limiting as to the scope of the present inventive concepts which is to be derived solely from the following claims.

Having thus described the invention, what is claimed as novel and desired to be secured by Letters Patent of the United States is:

1. A turbomachinery blade having,
    a base portion for attachment to a rotor and a portion extending therefrom having an airfoil radial cross section from the leading to the trailing edge thereof with the curved airfoil surfaces of the blade joining at said edges,
    said blade being formed by two halves on opposite sides of the approximate median camber line of said airfoil cross section throughout the radial length thereof,
    said halves being joined along surfaces extending a substantial distance marginally inwardly from said leading and trailing edges,
    said halves being relieved from said joined surfaces to form thin side walls defining a cavity within said blade,
    said side walls defining said cavity are relatively thin at the outer end of the airfoil portion and progressively increase in thickness towards said base portion,
    said blade halves having opposed projections within said cavity which extend from said side walls approximately to said median camber line, said halves also being joined at matching surfaces of said opposed projection,
    said projections being spaced apart substantially throughout said cavity and each having a smoothly curved cross section, said projections being formed with a smoothly curved outer surface which blends from the ends thereof to the inner side walls of the blade,
    the projections at the outer end portion of the airfoil portion having a relatively small cross section and being relatively closely spaced at the outer end portion of the airfoil portion,
    said projections having a relatively larger cross section and greater spacing towards said base portion.

2. A turbomachinery blade as in claim 1 wherein,
    the base portion is in the form of an arcuate tang approximating the curvature of the airfoil portion adjacent thereto,
    said halves being joined together along surfaces extending marginally inwardly from said tang to define the inner end of said cavity,
    said side walls, at the outer end of said airfoil portion being joined together to form a squealer tip and define the outer end of said cavity.

3. A turbomachinery blade as in claim 2 wherein,
    the projections are disposed in parallel radial rows and comprise an outer group of relatively small diameter which are closely spaced, an intermediate group which has a greater diameter and spacing and an inner group which has the greatest diameter and a greater spacing than the outer group.

4. A turbomachinery blade as in claim 1 wherein the projections are circular in cross section 5. A turbomachinery blade as in claim 1 wherein at least some of the opposed projections have smoothly curved recesses in their joined end faces.

References Cited

UNITED STATES PATENTS 3,017,159   1/1962   Foster et al. _____ 253—39.15

EVERETTE A. POWELL, JR., *Primary Examiner.*

SAMUEL FEINBERG, *Examiner.*